United States Patent [19]

Eisenberg

[11] Patent Number: 4,482,370
[45] Date of Patent: Nov. 13, 1984

[54] METHOD AND APPARATUS FOR FORMING GLASS FIBERS

[75] Inventor: Arnold J. Eisenberg, Granville, Ohio

[73] Assignee: Owens-Corning Fiberglas Corporation, Toledo, Ohio

[21] Appl. No.: 485,357

[22] Filed: Apr. 15, 1983

[51] Int. Cl.³ .......................................... C03B 37/085
[52] U.S. Cl. ................................................ 65/1; 65/2
[58] Field of Search .................................... 65/1, 2, 12

[56] References Cited

U.S. PATENT DOCUMENTS

| | | |
|---|---|---|
| 3,607,185 | 9/1971 | Andrysiak et al. ............... 65/1 X |
| 3,979,195 | 9/1976 | Strickland ............................. 65/1 |
| 4,379,713 | 4/1983 | Eisenberg ............................. 65/1 |
| 4,380,462 | 4/1983 | Shono et al. ......................... 65/1 |

Primary Examiner—Robert Lindsay
Attorney, Agent, or Firm—Ronald C. Hudgens; Philip R. Cloutier; Greg Dziegielewski

[57] ABSTRACT

A glass fiber-forming feeder having a bottom wall having a network of internal passageways interconnecting the field of orifices extending therethrough, and a method for producing such bottom walls is disclosed.

5 Claims, 5 Drawing Figures

METHOD AND APPARATUS FOR FORMING GLASS FIBERS

TECHNICAL FIELD

The invention disclosed herein relates to method and apparatus for forming glass fibers wherein the orifices extending through the bottom wall of the feeder have a plurality of spaced apart passageways within the wall interconnecting the orifices, wherein the sleeve of the orifice extends from one side of the wall to the opposite side of the wall.

BACKGROUND OF THE INVENTION

The most widely employed technique for the production of continuous glass filaments consists essentially of drawing the filaments from a feeder or bushing having a base plate provided with a plurality of nozzles or projections, each of the projections having an orifice adapted to permit the molten glass to flow therethrough to provide a stream of molten material in a fiberizable condition. Such projections are otherwise known as "tips".

Such "tip" type bushings generally reduce the phenomenon of "flooding" of the bushing bottom wall upon a disruption of a filament forming operation, known as a "breakout".

Flooding, the process wherein molten glass emerging from the bushing bottom wall generally spreads over the lower face of the bottom wall, is an acute problem with "tipless" bushings. That is, flooding is a particularly significant problem for bushings having a bottom wall comprised of a generally smooth or flat perforated plate with the streams of molten glass flowing from the orifices through the plate.

The flooding problems associated with such tipless bushings account for the fact that such bushings are not widely employed. The present invention provides a system wherein the phenomen of flooding and the problems associated therewith can be substantially reduced.

DISCLOSURE OF THE INVENTION

The present invention pertains to method and apparatus for producing orifices for producing filaments of inorganic material comprising a wall having a plurality of orifices extending therethrough adapted to supply a stream of molten material to be attenuated into filaments and spaced apart passageways within said wall extending between and in communication with said orifices, said orifices having a sleeve associated therewith extending from one side of said wall to the opposite side of said wall, said passageways being adapted to permit the molten inorganic material to move therethrough.

BEST MODE OF CARRYING OUT THE INVENTION

Figures 1, 2, 3, 4, 5:
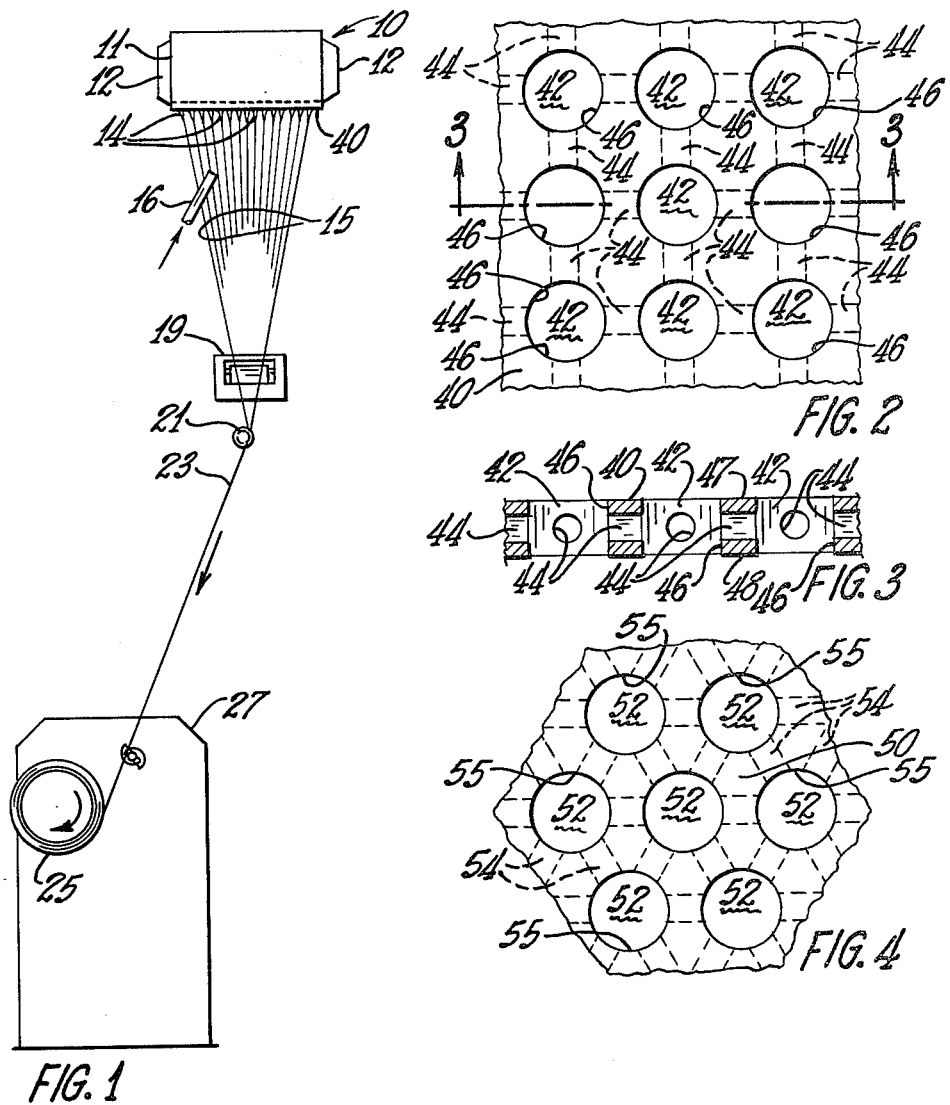
FIG. 1 discloses a semi-schematic elevational view of a textile fiber-forming system for producing continuous glass filaments.
FIG. 2 is a plan view of a portion of the bottom wall of the feeder shown in FIG. 1.
FIG. 3 is a cross-sectional view of the bottom wall shown in FIG. 2 taken along view 3—3.
FIG. 4 is a plan view of another bottom wall produced according to the principles of this invention.
FIG. 5 is a sectional view of a portion of the bottom wall as shown in FIG. 4 during fabrication.

As shown in FIG. 1, feeder or bushing 10 is adapted to supply a plurality of streams 14 of inorganic material, such as glass, to be attenuated into continuous filaments 15 through the action of winder 27. Filaments 15 receive a liquid size or coating at applicator 19 and are gathered into strand 23 at gathering shoe 21, as is known in the art. Strand 23 is then wound into a package 25 at winder 27, as is known in the art.

Environmental control means or blower 16 is adapted to supply a stream or streams of cooling fluid, such as air, toward streams 14 and bottom wall 40 to remove heat from the attenuation zone to facilitate attenuation of the streams into filaments.

Feeder 10 is comprised of housing or upper walls 11 joined to bottom wall 40 having terminals 12 associated therewith to electrically energize bottom wall 40 and/or housing 11 to heat the molten material therein. As such, terminals 12 are adapted to be connected to a suitable source of electrical power (not shown).

As shown in FIGS. 2 and 3, bottom wall 40 has a plurality of orifices 42 extending therethrough adapted to permit the molten material to pass therethrough and issue as attenuable streams of material. Each of the orifices 42 is defined by sleeve 46 extending continuously within wall 40 from one side 47 to the other side 48. Passageways 44 join orifices 42 at sleeves 46. A plurality of individual spaced-apart passageways 44 located within wall 40 are adapted to permit the molten material to move therethrough between predetermined orifices. As such, passageways 44 interconnect adjacent orifices 42. As shown in FIGS. 2 and 3, orifices 42 are arranged in a rectangular array with passageways 42 extending between the closest points of adjacent orifices. As such, passageways 44 are also arranged in a rectangular array, but it is to be understood that passageways 44 could be arranged in a diagonal pattern in lieu of or in addition to the rectangular orientation. Further, the cross-sectional area of an individual passageway 44 is less than the cross-sectional area of one of the orifices 42 associated therewith.

The present invention is to provide a fiber-forming system wherein a "tipless" orificed wall can be operated to provide a reduced tendency to "flood" during operation. It is believed that the forces or conditions at the bottom wall can be balanced or arranged to provide a system wherein if one or more filaments break out, the molten material issuing from the disrupted orifice will stop flowing therefrom and be transferred through or moved through the passageways 44 associated therewith to another orifice or other orifices in wall 40 still operating to produce a filament. As such, the molten material that would otherwise issue from the disrupted orifice and creep over the exterior surface of the bottom wall 40 to the surrounding orifice streams thereby "flooding" the exterior surface of bottom wall 40 is retained within feeder 10 until it issues as part of a stream from another undisrupted orifice. As such, the orifices 42 would otherwise be in a flooding relationship.

With the rectangular array as shown in FIG. 2, orifices 42 at the interior of the field of orifices are associated with four passageways 44 and four other orifices 42. It is to be understood that the molten material may be transferred from a disrupted orifice to an orifice further away than the orifices immediately adjacent thereto through the network of passageways 42.

Bottom wall 40 may be fabricated by forming a plurality of apertures through a plate and forming a plurality of channels between and in communication with the apertures along one side of the plate and then joining a second substantially flat plate to the first plate along the side having the channels therein to form the passageways 44 therebetween. The second plate may have a field of apertures already formed therein arranged to register with the apertures in the first plate, or the apertures in the second plate and/or the first plate may be formed subsequently to the joining of the two plates to form the wall.

Also, a pair of substantially identical plates having the channels formed therein along one side of each of the plates may be laminated to form the passageways between the orifices, which may be formed in the plates prior to the joining process or subsequent thereto. As such, passageways 44 may be located substantially equidistant between the sides 47 and 48 of wall 40, or may be biased closer to one side thereof as desired.

As shown in FIG. 4, orifices 52 of bottom wall 50 are arranged in staggered arrays such that an orifice within the inner region of the field of orifices is directly interconnected with six other orifices immediately adjacent thereto by means of spaced-apart passageways. Likewise, passageways 54 extend between and are in communication with immediately adjacent orifices 52. Also, sleeves 55, which define orifices 52 within wall 50 extend continuously from one side of wall 50 to the opposite side with passageways 54 joining orifice 52 at sleeve 55.

Similar to wall 40, wall 50 may be formed from a section or plate 57 having a plurality of apertures 59 extending therethrough associated with a plurality of channels 61 formed in one side of plate 57 to extend in between and in communication with apertures 59 along surface 63. As stated before, section 57 may be mated with a plate with or without similar channels formed therein to provide a bottom wall 50 having internal passageways 54 therethrough in communication with orifices 52 thereof. That is, the passageways form a network through which the orifices are internally connected. It is to be understood that the passageways 44 and 54 need not be of circular cross section, but may be of any desired shape.

Such plates of sections or walls can be made of any suitable material, such as platinum or a platinum-rhodium alloy. The sections or plates may be joined together by any suitable means such as by welding or hot isostatic pressing. Even though the present invention has been described in terms of a feeder having a substantially planar, that is "tipless" bottom wall, it is to be understood that tips or projections may be associated with the orifices if desired.

It is apparent that within the scope of the invention, modifications and different arrangements can be made other than as herein disclosed. The present disclosure is merely illustrative, with the invention comprehending all variations thereof.

INDUSTRIAL APPLICABILITY

The invention described herein is readily applicable to the production of glass filaments, whether continuous or discontinuous.

I claim:

1. A feeder for supplying molten inorganic streams for attenuation into filaments comprising a wall having a plurality of orifices extending therethrough adapted to supply said streams of molten material and a plurality of spaced-apart passageways, enclosed within said wall interconnecting said orifices, said orifices having a sleeve associated therewith extending from one side of said wall to the opposite side of said wall, said passageways being adapted to permit the molten inorganic material to move therethrough, said passageways joining said orifices at said sleeves.

2. The feeder of claim 1 wherein individual passageways have a cross-sectional area less than the cross-sectional area of individual orifices associated therewith.

3. The feeder of claim 1 wherein said orifices are associated with at least four passageways.

4. The feeder of claim 1 wherein said wall is substantially planar.

5. The method of producing glass fibers comprising:
providing a wall having a plurality of orifices extending therethrough adapted to supply streams of molten glass to be attenuated into filaments and having a plurality of spaced-apart passageways enclosed within said wall interconnecting said orifices, said orifices having a sleeve associated therewith extending from one side of said wall to the opposite side of said wall, said passageways being adapted to permit the molten inorganic material to move therethrough, said passageways joining said orifices at said sleeves; and attenuating the streams into filaments.

* * * * *